(12) United States Patent
Wang et al.

(10) Patent No.: US 10,165,562 B2
(45) Date of Patent: Dec. 25, 2018

(54) BLIND DETECTION METHOD AND SYSTEM FOR PHYSICAL DOWNLINK CONTROL CHANNEL (PDCCH)

(71) Applicant: DATANG LINKTESTER TECHNOLOGY CO., LTD., Beijing (CN)

(72) Inventors: Haixia Wang, Beijing (CN); Yajun Liu, Beijing (CN); Chunbai Tan, Beijing (CN)

(73) Assignee: Datang Linktester Technology Co., Ltd., Beijing (CN)

( * ) Notice: Subject to any disclaimer, the term of this patent is extended or adjusted under 35 U.S.C. 154(b) by 0 days.

(21) Appl. No.: 15/550,770

(22) PCT Filed: Jan. 28, 2016

(86) PCT No.: PCT/CN2016/072504
§ 371 (c)(1),
(2) Date: Aug. 11, 2017

(87) PCT Pub. No.: WO2016/127819
PCT Pub. Date: Aug. 18, 2016

(65) Prior Publication Data
US 2018/0035411 A1 Feb. 1, 2018

(30) Foreign Application Priority Data
Feb. 13, 2015 (CN) .......................... 2015 1 0080960

(51) Int. Cl.
*H04W 72/04* (2009.01)
*H04L 1/00* (2006.01)
*H04L 5/00* (2006.01)

(52) U.S. Cl.
CPC ............. *H04W 72/042* (2013.01); *H04L 1/00* (2013.01); *H04L 1/0038* (2013.01);
(Continued)

(58) Field of Classification Search
CPC ........... H04W 72/0406; H04W 72/042; H04W 74/002; H04W 74/006; H04L 1/0036; H04L 1/0038
See application file for complete search history.

(56) References Cited

U.S. PATENT DOCUMENTS 8,687,745 B2 * 4/2014 Lindoff ................. H04L 1/0091
375/341
9,510,335 B2 * 11/2016 Ko ........................ H04L 1/0061
(Continued)

FOREIGN PATENT DOCUMENTS

CN 101730139 A 6/2010
CN 101883369 A 11/2010
(Continued)

OTHER PUBLICATIONS

State IP Office of P.R. China—International Search Report of the International Searching Authority dated Apr. 28, 2016 for International Application No. PCT/CN2016/072504, including an English translation, 5 pages.
(Continued)

*Primary Examiner* — Kevin D Mew
(74) *Attorney, Agent, or Firm* — Womble Bond Dickinson (US) LLP

(57) ABSTRACT

A blind detection method and system for a PDCCH. The method comprises: acquiring PDCCH data; grouping the PDCCH data according to a location identifier of a resource element, and obtaining soft bit data according to each set of PDCCH data after grouping; acquiring control channel soft bit data from the soft bit data; determining DCI data according to the control channel element soft bit data; and acquiring a random access radio network temporary identifier according to the DCI data, to complete blind detection of a PDCCH. The technical solutions in the present application are applicable to a case in which an RNTI of a user is not
(Continued)

determined, can ensure accuracy of blind detection of a PDCCH, and greatly reduce a calculation amount and a calculation time.

15 Claims, 6 Drawing Sheets

(52) U.S. Cl.
CPC .......... *H04L 1/0045* (2013.01); *H04L 1/0061* (2013.01); *H04L 5/0053* (2013.01)

(56) References Cited

U.S. PATENT DOCUMENTS

| | | | | |
|---|---|---|---|---|
| 9,853,793 | B2* | 12/2017 | Lee, II | H04L 1/0038 |
| 9,900,883 | B2* | 2/2018 | Feng | H04L 5/001 |
| 2011/0085458 | A1* | 4/2011 | Montojo | H04L 1/0038 |
| | | | | 370/252 |
| 2012/0044921 | A1* | 2/2012 | Chung | H04J 11/0069 |
| | | | | 370/338 |
| 2013/0016672 | A1* | 1/2013 | Yang | H04L 1/0046 |
| | | | | 370/329 |
| 2013/0205176 | A1* | 8/2013 | Qian | H04L 1/0038 |
| | | | | 714/704 |
| 2013/0322355 | A1* | 12/2013 | Seo | H04L 1/1861 |
| | | | | 370/329 |
| 2014/0192770 | A1* | 7/2014 | Soldati | H04L 5/0048 |
| | | | | 370/330 |
| 2014/0286292 | A1* | 9/2014 | Park | H04L 5/0053 |
| | | | | 370/329 |
| 2014/0286297 | A1* | 9/2014 | Zhao | H04L 5/0053 |
| | | | | 370/329 |
| 2014/0348092 | A1* | 11/2014 | Ihm | H04J 11/0079 |
| | | | | 370/329 |
| 2015/0092695 | A1* | 4/2015 | Zhao | H04W 24/00 |
| | | | | 370/329 |
| 2015/0189628 | A1* | 7/2015 | Pan | H04L 1/00 |
| | | | | 370/329 |
| 2016/0143017 | A1* | 5/2016 | Yang | H04L 1/1812 |
| | | | | 370/329 |
| 2016/0249337 | A1* | 8/2016 | Liang | H04W 72/042 |
| 2018/0176892 | A1* | 6/2018 | Kim | H04W 72/0406 |

FOREIGN PATENT DOCUMENTS

| | | |
|---|---|---|
| CN | 102246548 A | 11/2011 |
| CN | 103297195 A | 9/2013 |
| CN | 103457688 A | 12/2013 |
| CN | 103731236 A | 4/2014 |
| CN | 104683069 A | 6/2015 |
| EP | 2779501 A1 | 9/2014 |
| WO | WO 2011/035495 A1 | 3/2011 |
| WO | WO2013066084 A2 | 5/2013 |

OTHER PUBLICATIONS

State IP Office of P.R. China—Written Opinion of the International Searching Authority dated Apr. 28, 2016 for International Application No. PCT/CN2016/072504, 4 pages.

Mediatek Inc., "Discussion on Signaling Methods for UE-Specific PDCCH," 3GPP TSG-RAN WG1 #66, Aug. 26, 2011, pp. 1-4.

PCT Notification of Transmittal of International Preliminary Report on Patentability for PCT Application No. PCT/CN2016/072504 with full English translation, 11 pgs. (Aug. 15, 2017).

Office Action received for Korean Patent Application 10-2017-7025860, dated Mar. 15, 2018, 3 pages. (English Language Translation Attached).

* cited by examiner

BLIND DETECTION METHOD AND SYSTEM FOR PHYSICAL DOWNLINK CONTROL CHANNEL (PDCCH)

FIELD

The invention relates to a communication technology, and in particular to a blind detection method and system for physical downlink control channel (PDCCH).

BACKGROUND

Long Term Evolution (LTE) of the 3rd Generation Partner Ship Project (3GPP) is the key technology of the next-generation cellular mobile communication. The physical layer uplink/downlink transmission scheme adopts a Single Carrier Frequency Division Multiple Access (SC-FDMA) with low peak-to-average ratio and an advanced and mature Orthogonal Frequency Division Multiple Access (OFDMA) technology respectively, based on which, Fast Link Adaptation and Multi-Input Multi-Output (MIMO) technology is introduced to improve the performance of LTE system.

The Physical Downlink Control Channel (PDCCH) bears the uplink and downlink control information of the whole system, and is closely related to the scheduling and allocation of resources of the whole system. Receiving of the channel plays a very important role in LTE system. Receiving of the PDCCH decides the delay of the whole system, thereby affecting the overall rate of reaction.

PDCCH bears the Downlink Control Information (DCI), including resource allocation and other control information of one or more User Equipments (UEs). Usually, there may be multiple PDCCHs in one subframe. UE needs to demodulate DCI in PDCCH first, and then demodulate the Physical Downlink Shared Channel (PDSCH) (including broadcasting message, paging, UE data, etc.) of UE at the corresponding resource location. A great variety of information can be transmitted over PDCCH during system operation, but which information can be transferred in each transmission is determined by the system deployment program. In LTE, the number of symbols occupied by PDCCH in one subframe is determined by the Control Format Indicator (CFI) defined in the Physical Control Format Indicator Channel (PCFICH). UE can determine the physical cell ID through primary/secondary synchronization signals, and determine the resource pattern of Physical Hybrid-ARQ Indicator Channel (PHICH) and system antenna port(s) and other contents through reading the Physical Broadcast Channel (PBCH). UE can then further read PCFICH and obtain the number of OFDM symbols occupied by the control channel like PDCCH. Besides PDCCH, the symbols occupied by PDCCH also include PCFICH, PHICH, and Reference Signal (RS), and so on, where PCFICH has been demodulated, allocation of PHICH is determined by PBCH, and pattern of RS is determined by the number of broadcasting antenna ports in PBCH. Thus, the Resource Elements (REs) occupied by all PDCCHs in one subframe can be determined.

Because a plurality of PDCCHs can be contained in the transmission bandwidth of PDCCH, in order to effectively configure the time-frequency resources of PDCCH and other downlink control channels, LTE defines two dedicated control channel resource units: RE Group (REG) and Control Channel Element (CCE). One REG is composed of 4 or 6 adjacent REs on the same OFDM symbol, but only 4 REs are available, the REG consisting of 6 REs includes two Reference Signals (RS), but the RE occupied by RS can't be available for the REG of the control channel. The protocol (36.211) also specifies in particular that when only one cell-specific reference signal is available, from the perspective of RE mapping in REG two antenna ports have to be assumed, so one REG may contain 4 REs or 6 REs. One CCE consists of 9 REGs.

PDCCH is transmitted in one or more of continuous CCEs; LTE supports 4 different types of PDCCHs, as shown in table 1.

TABLE 1

| PDCCH format | CCE number | REG number | PDCCH bit number |
|---|---|---|---|
| 0 | 1 | 9 | 72 |
| 1 | 2 | 18 | 144 |
| 2 | 4 | 36 | 288 |
| 3 | 8 | 72 | 576 |

In LTE, numbering and allocation of CCE is continuous. If the number of remaining REGs is NREG after the system allocates PCFICH and PHICH, the number of CCEs available by PDCCH is NCCE=NREG/9 rounded down. CCE is numbered from 0 to NCCE-1. The number of CCE occupied by PDCCH is determined by the downlink channel environment of UE. For the UE in a good downlink channel environment, the evolved NodeB (eNodeB) may only need to allocate one CCE; for the UE in a poor downlink channel environment, eNodeB may need to allocate as many as 8 CCEs. In order to simplify the complexity when UE decodes PDCCH, LTE also specifies that for the PDCCH which occupies N CCEs, the index of CCE at the start position of PDCCH must be an integral multiple of N.

When receiving the information sent by eNodeB, UE needs to monitor all PDCCHs in each subframe to detect whether the PDCCH contains the scheduling information or control information required, and needs to know the setting position of the CCE(s) corresponding to each PDCCH during monitoring. In order to describe such position information, that is, UE needs to monitor the position information of CCE candidate set, LTE defines the concept of search space, and classifies the search space into a Common Search Space and a UE-Specific Search Space. PDCCH candidates monitored by UE are shown in table 2.

TABLE 2

| Type of search space | Aggregation level of search space | Size of search space (with CCE as a unit) | Number of PDCCH candidates |
|---|---|---|---|
| Common search space | 1 | 6 | 6 |
| | 2 | 12 | 6 |
| | 4 | 8 | 2 |
| | 8 | 16 | 2 |
| UE-specific search space | 4 | 16 | 4 |
| | 8 | 16 | 2 |

Each PDCCH contains 16 bits of Cyclic Redundancy Check (CRC) which is configured to validate by the UE whether the PDCCHs received are correct; CRC uses UE-related identity for scrambling, so that UE can confirm which PDCCHs are to be received and which PDCCHs are to be sent to other UEs. The UE Identity useable for scrambling is Random Access Radio Network Temporary (RNTI). After being checked by CRC, Tail Biting convolutional encoding and rate matching are performed to each PDCCH. ENodeB can perform rate matching according to the Channel Quality Indicator (CQI) reported by UE. Then, the number of CCEs occupied by each PDCCH can be confirmed.

The available CCE is numbered from 0 to NCCE-1. CCEs can be considered as logical resources and arranged sequentially to be shared by all PDCCHs. The eNodeB can place each PDCCH at an appropriate position according to the start position of CCE on each PDCCH. Under such a circumstance, some CCEs may not be occupied. According to the standard, NIL needs to be inserted (meaning void value), and the transmit power on RE corresponding to NIL is 0.

Then, data bits on CCE are subjected to physical cell ID-related scrambling, Quaternary Phase Shift Keying (QPSK) modulation, layer mapping and precoding, and the symbols obtained take Symbol Quadruplet (each Symbol Quadruplet is mapped to one REG) as a unit for interleaving and cyclic shift, and are finally mapped to the corresponding physical resource REG Physical resource REGs are first allocated to PCFICH and PHICH and remaining ones are allocated to PDCCH for REG mapping following the principle of time domain first and frequency domain later. In this way, disequilibrium between PDCCH symbols can be avoided.

The current PDCCH blind detection method is designed for UE. In this method, the start position of DCI information is calculated through the given RNTI, then all aggregation levels are traversed once, and RNTI is used for CRC validation of the decoding result to acquire the DCI information of UE. Under the circumstance that RNTI of each user is unknown, if the current method is used, all RNTIs (ranging from 1 to 65535) need to be calculated. For the existing hardware level, the operation time is very long.

SUMMARY

The invention provides a blind detection method and system for physical downlink control channel (PDCCH) to solve the problem that when RNTI is unknown, the current PDCCH blind detection method needs a very long operation time to determine RNTI.

In order to solve the mentioned problem, the invention discloses a PDCCH blind detection method, including:
  acquiring PDCCH data;
  grouping the PDCCH data according to the Identifications of Positions of REs, and acquiring soft bit data according to each group of PDCCH data;
  acquiring Control Channel Element (CCE) soft bit data from the soft bit data:
  determining Downlink Control Information (DCI) data according to the CCE soft bit data;
  and acquiring Random Access Radio Network Temporary Identity according to the DCI data to finish PDCCH blind detection.

Correspondingly, the invention also discloses a PDCCH blind detection system, including:
  a first data acquisition module configured to acquire PDCCH data:
  a second data acquisition module configured to group the PDCCH data according to Identifications of Positions of REs, and acquire the soft bit data according to each group of PDCCH data;
  a third data acquisition module configured to acquire the CCE soft bit data from the soft bit data;
  a DCI data acquisition module configured to determine Downlink Control Information (DCI) data according to the CCE soft bit data; and a Radio Network Temporary Identity acquisition module configured to acquire Random Access Radio Network Temporary Identity according to the DCI data to finish PDCCH blind detection.

Compared with the background art, the invention has the advantages that:

The technical solution is a PDCCH blind detection on the occasion that user's RNTI is unknown and the number of users is also unknown. The invention includes the steps of performing power detection to the PDCCH information received according to the characteristics of Tail Biting convolutional encoding, grouping the continuous REs, subjecting each group of data to channel equalization, detection and demodulation, and descrambling respectively, and extracting data according to the different aggregation levels, subjecting all possible DCI formats to rate de-matching and decoding, acquiring the correct DCI according to the characteristics of Tail Biting convolutional encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

DETAILED DESCRIPTION

In order to make the objects, characteristics and advantages of the invention more apparent and understandable, the present application will be described below in details with reference to the drawings and embodiments.

The embodiment of the invention provides a PDCCH blind detection method with low-complexity which includes: determining the positions of REs occupied by all PDCCHs in one subframe according to the number of OFDM symbols of the control channel according to demodulated and decoded PCFICH and the system configuration information, and acquiring valid PDCCH data of the control channel through power detection; grouping PDCCH data according to positions of REs, and subjecting each group of PDCCH to channel equalization, demodulation, and descrambling respectively to acquire the soft bit; judging the possible aggregation levels according to the length of each group of PDCCH data, and extracting data from the soft bit according to the different aggregation levels and start position; subjecting all extracted data to rate de-matching and decoding according to all possible DCI formats, and acquiring the correct DCI according to the characteristics of Tail Biting convolutional encoding; and acquiring the correct RNTI according to CRC bits.

The PDCCH blind detection method and system according to the invention is described in detail by some embodiments.

Embodiment 1

A PDCCH blind detection method according to the embodiment of the invention is described in detail.

Figure 1:
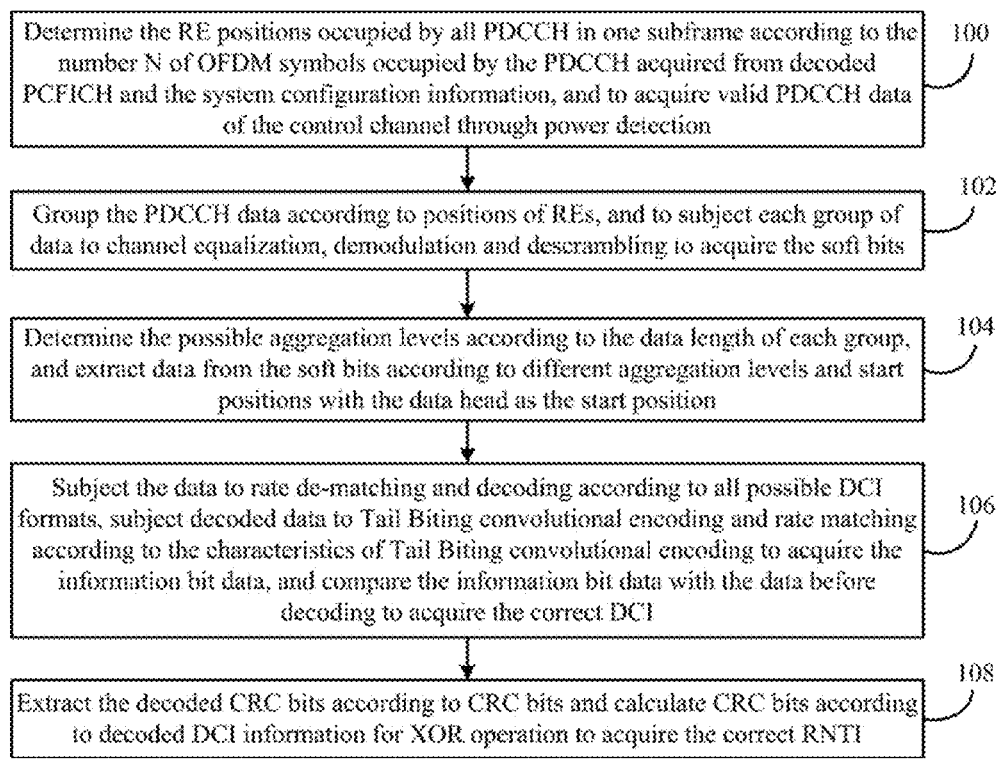
FIG. 1 is a flowchart of a PDCCH blind detection method in embodiment 1 of the present application.

Referring to FIG. 1, the flowchart of a PDCCH blind detection method according to the embodiment of the invention is illustrated.

Step 100 is to determine the RE position(s) occupied by all PDCCHs in one subframe according to the number N of OFDM symbols occupied by the PDCCH(s) acquired from decoded PCFICH and the system configuration information, and to acquire valid PDCCH data of the control channel through power detection.

Step 100 can include:

Substep 1001 is to acquire the number N of OFDM symbols occupied by PDCCH according to decoded PCFICH; besides PDCCH, the N symbols occupied by PDCCH also includes PCFICH, PHICH, and RS and so on, wherein PCFICH has been demodulated, pattern of PHICH is determined by PBCH, and pattern of RS is determined by the number of broadcasting antenna ports in PBCH. Therefore, the REs occupied by all PDCCHs in one subframe can be determined;

and substep 1002 is to subject each of REs occupied by PDCCH to power detection; set the power threshold $P_{Theshold}$ as the power of pilot channel $P_{Pilot}$ deducted by the power allowance of radio link $L_{adj}$, namely $P_{Threshold} = P_{Pilot} - L_{adj}$, and calculate the power of each RE; and compare the RE power $P_{RE}$ with the power threshold to acquire all REs with $P_{RE} > P_{Threshold}$, and identifying the positions of all REs;

When $P_{RE} > P_{Threshold}$, RE_FLAG[n]=1 (n=0, 1, 2 ... );
When $P_{RE} < P_{Threshold}$, RE_FLAG[n]=0 (n=0, 1, 2 ... );
wherein, n is the number of all REs, and RE_FLAG[n] is the corresponding identification information.

Step 102 is to group the PDCCH data according to positions of REs, and to subject each group of data to channel equalization, demodulation and descrambling to acquire the soft bits.

Preferably, step 102 can include:

Substep 1021 is to group REs according to the Position Identification RE_FLAG[n], group the REs continuously with the Identification of Position RE_FLAG[n] as 1 into one group, and calculate according to the data of each group respectively by supposing N groups are available, namely Pdcch_all[n][k] (wherein the number of groups n=0, 1, . . . , N−1; the number of continuous REs in each group is k=0, 1, . . . , $N_{RE}$−1);

substep 1022 is to subject each group of data Pdcch_all [n][k] to channel equalization and QPSK demodulation, and then to descrambling according to the known physical cell ID to acquire the soft bits: Soft_bits_all[nbit] (wherein nbit=2*NRE);

Step 104 is to determine the possible aggregation levels according to the data length of each group, and extract data from the soft bits according to different aggregation levels and start positions with the data head as the start position.

Preferably, step 104 can include:

Substep 1041 is to calculate the data length $N_{REG}$ of each group according to the number $N_{RE}$ of continuous REs in each group, namely $N_{REG} = N_{RE}/4$;

substep 1042 is to acquire the number of CCEs available for PDCCH according to the data length $N_{REG}$ of each group, namely, $N_{CCE} = N_{REG}/9$ rounded down, and numbering CCE from 0 to $N_{CCE}-1$;

substep 1043: as shown in table 2, the aggregation levels corresponding to the Common Search Space are Common_space=[8,4,2,1]; the aggregation levels corresponding to UE-Specific Search Space are UE_space=[8, 4]1 therefore, all possible aggregation levels are Search_space[i]=[8, 4, 2, 1], (i=0, 1, 2, 3); the number of CCEs in each group $N_{CCE}$ is compared with all possible aggregation levels:

if $N_{CCE}$ < Search_space[i], Search_space[i]=0 shall be deleted;

substep 1044 is to compute the start position of CCE in computation now cce_start_now with the data head as the start position according to the different aggregation levels Search_space_use[i] acquired from substep 1043;

and substep 1045 is to determine whether the CCE groups contain the group with detected DCI information; if there is an intersection set, the computation is finished; if there is no an intersection set, data can be extracted from the soft bits Soft_bits_all acquired in step 102 according to the start position of CCE.

Soft_cce_bits[n]=Soft_bits_all
[(cce_start_now−1)*72+1:(cce_start_now−1+Search_space_use[i])*72), (n=0, 1, . . . , $L_{Soft\_cce\_bits}$−1).

The length of data Soft_cce_bits is $L_{Soft\_cce\_bits}$; step 106 is then performed.

Step 106 is to subject the data to rate de-matching and decoding according to all possible DCI formats, subject decoded data to Tail Biting convolutional encoding and rate matching according to the characteristics of Tail Biting convolutional encoding to acquire the information bit data, and compare the information bit data with the data before decoding to acquire the correct DCI.

Preferably, step 106 can include:

substep 1061 is to determine all possible DCI formats according to 3GPP TS 36.213 protocol and the corresponding relation between DCI format and the transmission mode;

substep 1062 is to, according to TS 36.212 of 3GPP protocol, acquire the length of different DCI formats from the computation according to the protocol;

substep 1063 is to subject data Soft_cce_bits in step S1035 rate de-matching and convolutional decoding according to all possible DCI formats to acquire the decoded information bits Decoded_bits[n], (n=0, 1, 2, . . . . $L_{Decoded-1}$);

Decoded_bits[n] is divided into two parts:
The former part is DCI information bits, namely:
DCI[i]=Decoded_bits[n], (i=n=0, 1, . . . , $L_{DCI}$−1).
The latter part is CRC check bits, namely:
CRC[j]=Decoded_bits[n] (j=0, 1, . . . , $L_{CRC}$−1; n= $L_{DCI}$, . . . , $L_{Decoded}$−1).
Where $L_{Decoded} = L_{CRC} + L_{DCI}$; $L_{CRC}$=16.

The step of rate de-matching includes: bit receiving, bit separation, and subblock de-interleaver; Convolutional decoding adopts Viterbi probabilistic decoding algorithm. In Viterbi decoding algorithm, the statistical characteristics of channel is considered, the distances between the codes received and all possible raster paths are calculated, and the raster path with the shortest distance from the codes received is packed out as decoded output of Viterbi. As Viterbi decoding algorithm is commonly known by the researchers in this art. Viterbi decoding algorithm will not be further described here.

Substep 1064 is to extract the decoded information bits Decoded_bits[n], (n=0, 1, . . . , L Soft_cce_bits−1) and subject the information bits Decoded_bits[n] to Tail Biting convolutional encoding and rate matching to acquire the data bits RateMatch_bits[n], (n=0, 1, . . . . $L_{Soft\_cce\_bits}$-1):

According to the characteristic of Tail Biting convolution encoding that correct decoding can be available only when the start position of data is completely precise, the soft bits before decoding is subjected to hard decision to acquire the hard bits Hard_cce_bits[n], and the hard bits are then compared with the data bits after rate matching one by one.

If Hard_cce_bits[n]=RateMatch_bits [n], (n=0, 1 . . . . , $L_{Soft\_cce\_bits}$-1), the corresponding DCI format is a correct format. The DCI information bit DCI[i] decoded according to the DCI format is the correct DCI; then step 108 comes.

If Hard_cce_bits[n]≠RateMatch_bits [n], (n=0, 1, . . . . $L_{Soft\_cce\_bits}$-1), the corresponding DCI format is wrong, then return to substep 1044.

Step 108 is to extract the decoded CRC bits according to CRC bits and to calculate CRC bits according to decoded DCI information for XOR operation to acquire the correct RNTI.

Preferably, step 108 can include:

substep 1081 is to calculate and acquire CRC bits CRC_bits[n], (n=0, 1, . . . , $L_{CRC}$-1) according to the decoded bit data Decoded_bits[n] and the algorithm in section 5.1.1 of 3GPP TS 36.212 protocol:

and substep 1082 is to subject the CRC bits CRC[n] acquired from decoding in substep 1063 and the CRC bits CRC_bits[n] acquired from substep 1081 for XOR operation to acquire the correct RNTI, namely RNTI[n]=XOR(CRC[n], CRC_bits[n]), (n=0, 1, . . . . $L_{CRC}$-1).

In conclusion, the technical solution of the invention is the PDCCH blind detection on the occasion that user's RNTI is unknown and the number of users is also unknown. The invention includes the steps of performing power detection to the PDCCH information received according to the characteristics of Tail Biting convolution encoding, grouping the continuous REs, subjecting each group of data to channel equalization, detection and demodulation, and descrambling respectively, and extracting data according to the different aggregation levels, subjecting all possible DCI formats to rate de-matching and decoding, acquiring the correct DCI according to the characteristics of Tail Biting convolution encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

Embodiment 2

A PDCCH blind detection method according to the embodiment of the invention is described in detail.

Figure 2:
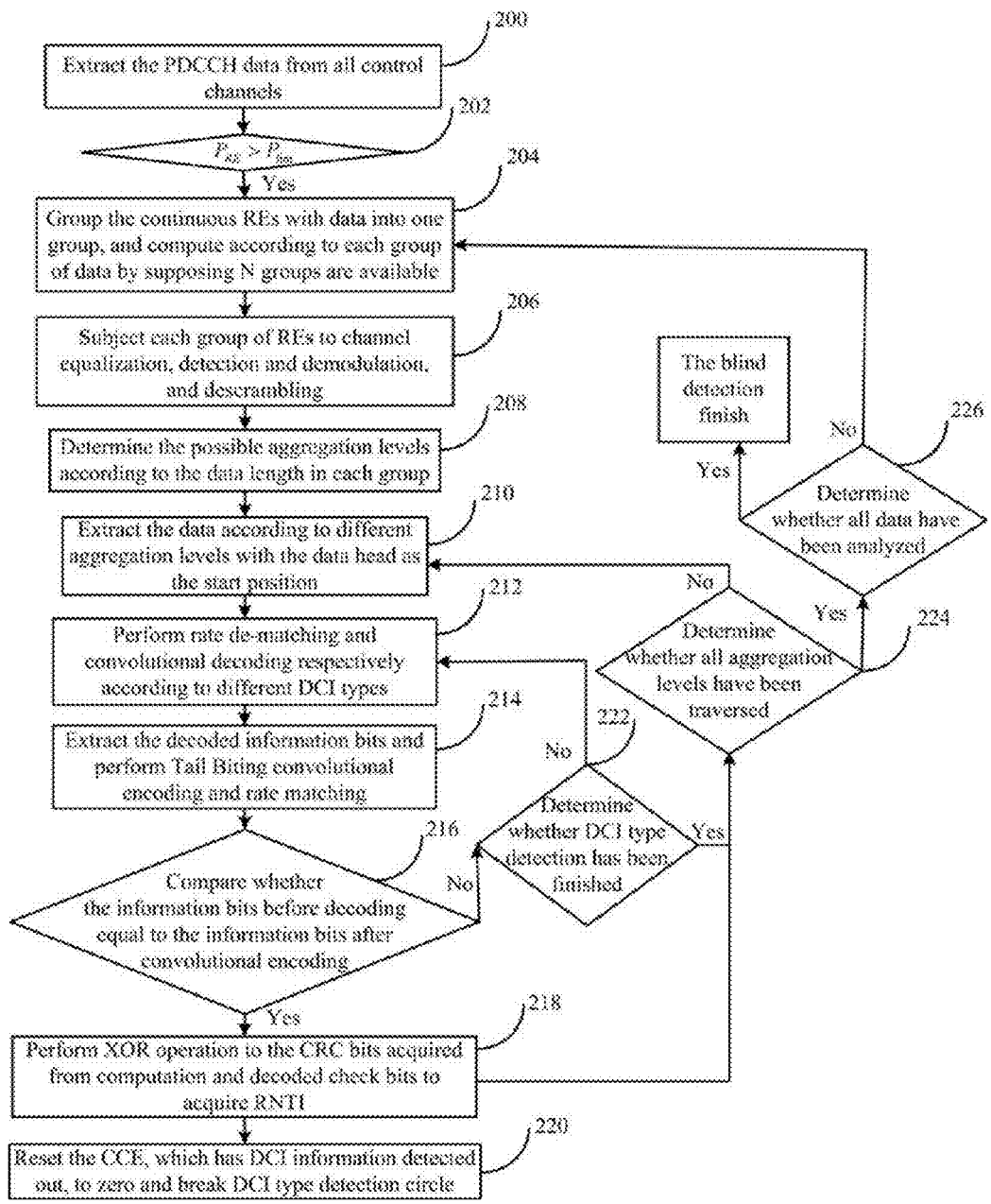
FIG. 2 is a flowchart of a PDCCH blind detection method in embodiment 2 of the present application.

Referring to FIG. 2, the flowchart of a PDCCH blind detection method provided by the embodiment of the invention is illustrated.

Step 200 is to extract the PDCCH data from all control channels.

Step 202 is to determine whether RE power $P_{RE}$ is larger than the power threshold $P_{lim}$; if so, to proceed to step 204.

Step 204 is to group the continuous REs with data into one group, and compute according to each group of data by supposing N groups are available.

Step 206 is to subject each group of REs to channel equalization, detection and demodulation, and descrambling.

Step 208 is to determine the possible aggregation levels according to the data length in each group.

Step 210 is to extract the data according to different aggregation levels with the data head as the start position.

Step 212 is to perform rate de-matching and convolutional decoding respectively according to different DCI types.

Step 214 is to extract the decoded information bits and perform Tail Biting convolutional encoding and rate matching.

Step 216 is to compare whether the information bits before decoding equal to the information bits after convolutional encoding; if so, to proceed to step 218; if not, to proceed to step 222.

Step 218 is to perform XOR operation to the CRC bits acquired from computation and decoded check bits to acquire RNTI.

Step 220 is to reset the CCE, which has DCI information detected out, to zero and break DCI type detection circle.

Step 222 is to determine whether DCI type detection has been finished; if not, to proceed to step 212; if so, to proceed to step 224.

Step 224 is to determine whether all aggregation levels have been traversed; if so, to proceed step 226; if not, to proceed to step 210.

Step 226 is to determine whether all data have been analyzed; if so, the blind detection is finished; if not, to proceed to step 204.

In conclusion, the technical solution of the invention is the PDCCH blind detection on the occasion that user's RNTI is unknown and the number of users is also unknown. The invention includes the steps of performing power detection to the PDCCH information received according to the characteristics of Tail Biting convolutional encoding, grouping the continuous REs, subjecting each group of data to channel equalization, detection and demodulation, and descrambling respectively, and extracting data according to the different aggregation levels, subjecting all possible DCI formats to rate de-matching and decoding, acquiring the correct DCI according to the characteristics of Tail Biting convolutional encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

Embodiment 3

A PDCCH blind detection method according to the embodiment of the invention is described in details.

Figure 3:
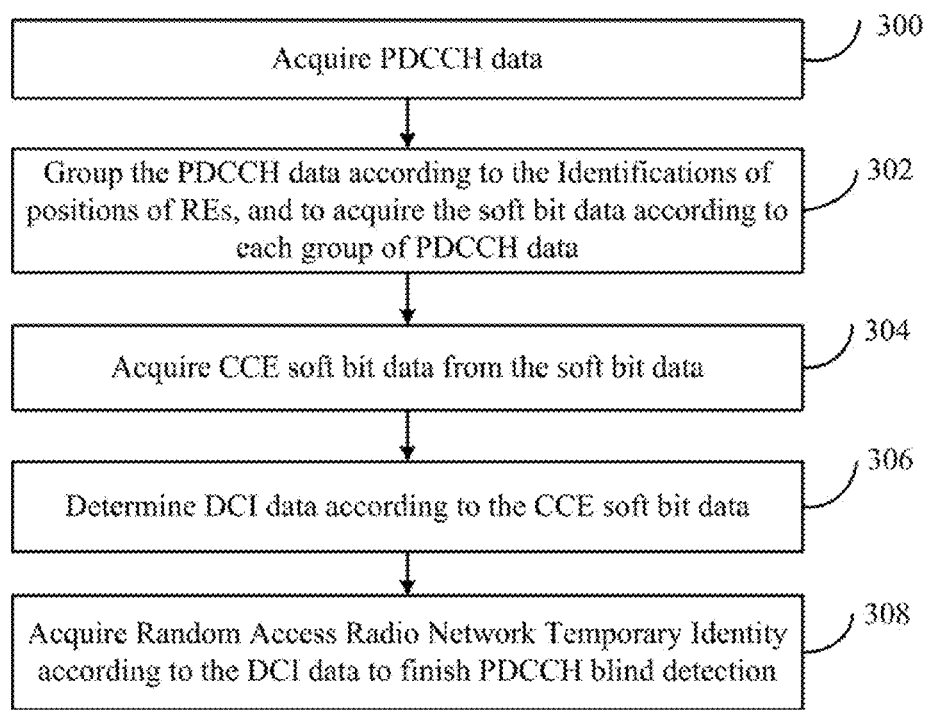
FIG. 3 is a flowchart of a PDCCH blind detection method in embodiment 3 of the present application.

Referring to FIG. 3, the flowchart of a PDCCH blind detection method provided by the embodiment of the invention is illustrated.

Step 300 is to acquire PDCCH data.

The positions of REs occupied by all PDCCHs in one subframe are determined according to the number N of OFDM symbols occupied by the PDCCH acquired from decoded PCFICH and the system configuration information, and valid PDCCH data of the control channel is acquired through detection and comparison of powers of REs.

Step 302 is to group the PDCCH data according to the Identifications of positions of REs, and to acquire the soft bit data according to each group of PDCCH data.

The continuous REs with the Identification of Position RE_FLAG[n] as 1 are grouped into one group; suppose N groups are available, namely Pdcch_all[n][k] (wherein the number of groups n=0, 1, . . . , N−1; the number of continuous REs in each group is k=0, 1, . . . , $N_{RE}$−1).

Step 304 is to acquire CCE soft bit data from the soft bit data.

The possible aggregation levels are determined according to the data length of each group; and CCE soft bit data is extracted from the soft bit data according to different aggregation levels and start positions with the data head as the start position.

Step 306 is to determine DCI data according to the CCE soft bit data.

The CCE soft bit data is subjected to rate de-matching and decoding according to all possible DCI formats; the decoded data is subjected to Tail Biting convolutional encoding and rate matching according to the characteristics of Tail Biting convolutional encoding to acquire the information bit data; and the information bits are compared with the data before decoding to acquire the correct DCI.

Step 308 is to acquire Random Access Radio Network Temporary Identity according to the DCI data to finish PDCCH blind detection.

The decoded CRC bits extracted according to CRC check bits, and CRC bits computed according to DCI information after decoding are subjected to XOR operation to acquire the correct RNTI.

In conclusion, the technical solution of the invention is the PDCCH blind detection on the occasion that user's RNTI is unknown and the number of users is also unknown. The invention includes the steps of performing power detection to the PDCCH information received according to the characteristics of Tail Biting convolutional encoding, grouping the continuous REs, subjecting each group of data to channel equalization, detection and demodulation, and descrambling respectively, and extracting data according to the different aggregation levels, subjecting all possible DCI formats to rate de-matching and decoding, acquiring the correct DCI according to the characteristics of Tail Biting convolutional encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

Embodiment 4

A PDCCH blind detection method according to the embodiment of the invention is described in detail.

Figure 4:
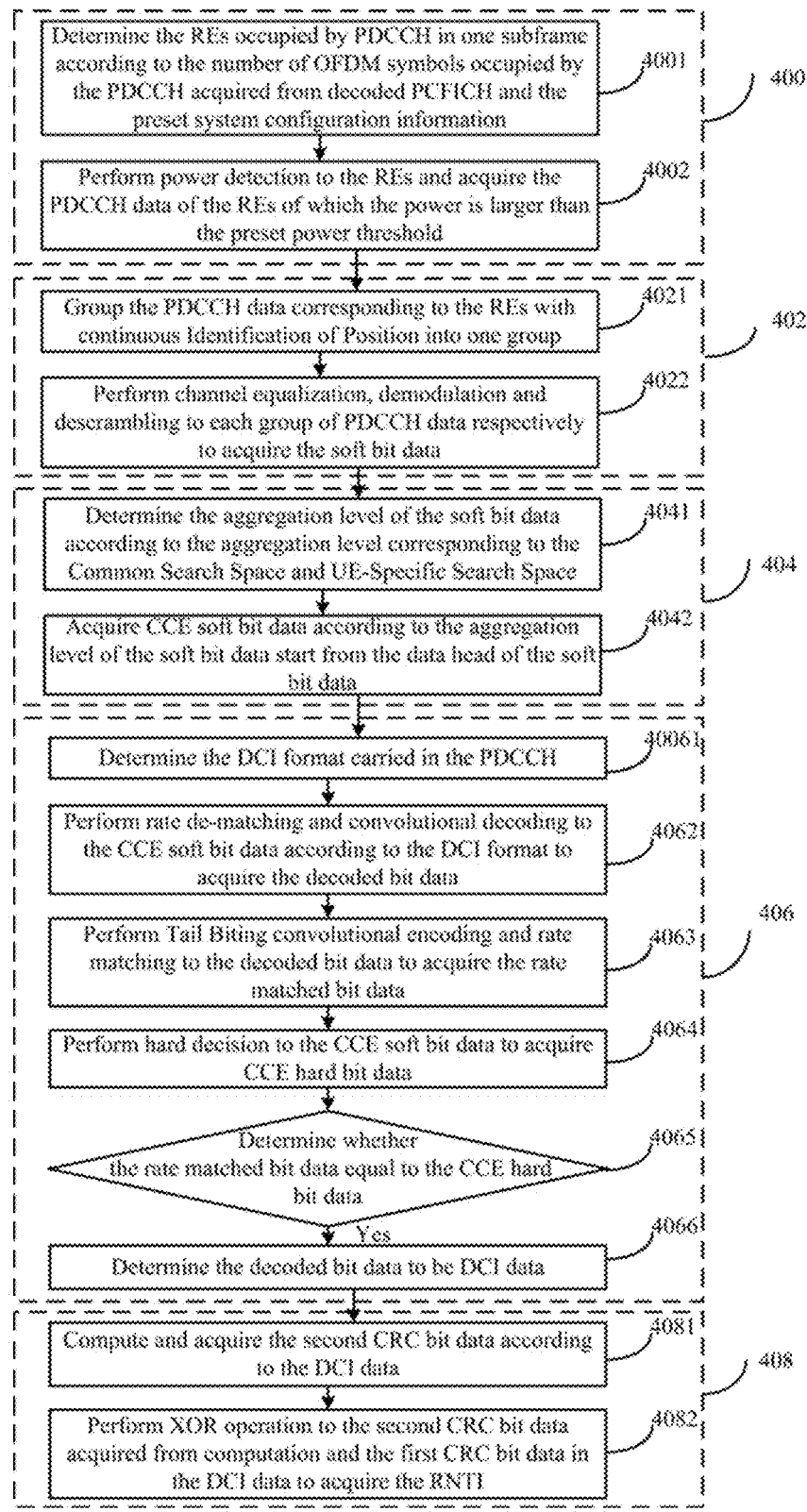
FIG. 4 is a flowchart of a PDCCH blind detection method in embodiment 4 of the present application.

Referring to FIG. 4, the flowchart of a PDCCH blind detection method according to the embodiment of the invention is illustrated.

Step 400 is to acquire PDCCH data;

The positions of REs occupied by all PDCCHs in one subframe are determined according to the number N of OFDM symbols occupied by the PDCCHs acquired from decoded PCFICH and the system configuration information, and valid PDCCH data of the control channel is acquired through detection and comparison of powers of REs.

Preferably, step 400 can include:

Substep 4001 is to determine the REs occupied by PDCCH in one subframe according to the number of OFDM symbols occupied by the PDCCH acquired from decoded PCFICH and the preset system configuration information; and Substep 4002 is to perform power detection to the REs and acquire the PDCCH data of the REs of which the power is larger than the preset power threshold.

Step 402 is to group the PDCCH data according to the Identifications of Positions of REs, and acquire the soft bit data according to each group of PDCCH data.

The continuous REs with the Identification of Position RE_FLAG[n] as 1 are grouped into one group; suppose N groups are available, namely Pdcch_all[n][k] (wherein the number of groups n=0, 1, . . . , N−1; the number of continuous REs in each group is k=0, 1, . . . , $N_{RE}$−1).

Preferably, step 402 can include:

Substep 4021 is to group the PDCCH data corresponding to the REs with continuous Identification of Position into one group; and Substep 4022 is to perform channel equalization, demodulation and descrambling to each group of PDCCH data respectively to acquire the soft bit data.

Step 404 is to acquire CCE soft bit data from the soft bit data:

The possible aggregation levels are determined according to the data length of each group; and extracting CCE soft bit data from the soft bit data according to different aggregation levels and a start position with the data head as the start position.

Preferably, step 404 can include:

Substep 4041 is to determine the aggregation level of the soft bit data according to the aggregation level corresponding to the Common Search Space and UE-Specific Search Space; and Substep 4042 is to acquire CCE soft bit data according to the aggregation level of the soft bit data start from the data head of the soft bit data.

Step 406 is to determine DCI data according to the CCE soft bit data.

The CCE soft bit data is subjected to rate de-matching and decoding according to all possible DCI formats; the decoded data is subjected to Tail Biting convolutional encoding and rate matching according to the characteristics of Tail Biting convolutional encoding to acquire the information bit data; and the information bits are compared with the data before decoding to acquire the correct DCI.

Preferably, step 406 can include:

Substep 4061 is to determine the DCI format carried in the PDCCH:

Substep 4062 is to perform rate de-matching and convolutional decoding to the CCE soft bit data according to the DCI format to acquire the decoded bit data;

Substep 4063 is to perform Tail Biting convolutional encoding and rate matching to the decoded bit data to acquire the rate matched bit data;

Substep 4064 is to perform hard decision to the CCE soft bit data to acquire CCE hard bit data:

Substep 4065 is to determine whether the rate matched bit data equal to the CCE hard bit data; if so, to proceed to substep 4066; if not, the process is finished; and Substep 4066 is to determine the decoded bit data to be DCI data:

Where the DCI data include DCI bit data and the first CRC bit data.

Step 408 is to acquire Random Access Radio Network Temporary Identity according to the DCI data to finish PDCCH blind detection.

The decoded CRC bits extracted according to CRC bits, and CRC bits computed according to DCI information after decoding are subjected to XOR operation to acquire the correct RNTI.

Preferably, step 408 can include:

Substep 4081 is to compute and acquire the second CRC bit data according to the DCI data:

Substep 4082 is to perform XOR operation to the second CRC bit data acquired from computation and the first CRC bit data in the DCI data to acquire the RNTI.

In conclusion, the technical solution of the invention is the PDCCH blind detection on the occasion that user's RNTI is unknown and the number of users is also unknown. The invention includes the steps of performing power detection to the PDCCH information received according to the characteristics of Tail Biting convolutional encoding, grouping the continuous REs, subjecting each group of data to channel equalization, detection and demodulation, and descrambling respectively, and extracting data out according to the different aggregation levels, subjecting all possible DCI formats to rate de-matching and decoding, acquiring the correct DCI according to the characteristics of Tail Biting convolutional encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

Embodiment 5

A PDCCH blind detection system according to the embodiment of the invention is described in detail.

Figure 5:
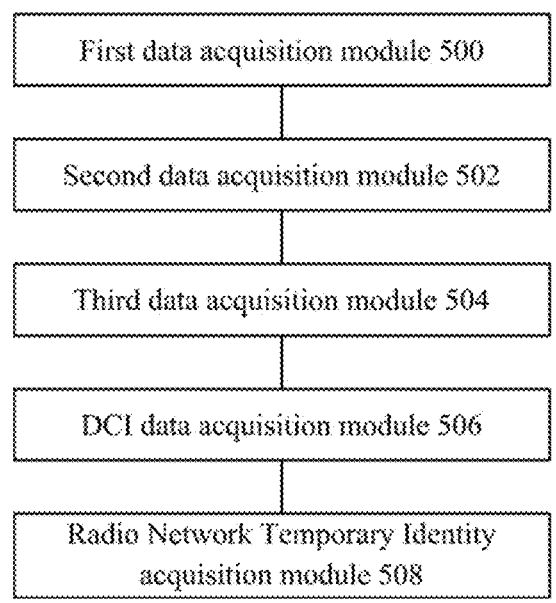
FIG. 5 is a schematic structural diagram of a PDCCH blind detection system in embodiment 5 of the present application.

Referring to FIG. 5, the schematic structural diagram of a PDCCH blind detection system according to the embodiment of the invention is illustrated.

The system can include: a first data acquisition module 500, a second data acquisition module 502, a third data acquisition module 504, a DCI data acquisition module 506, and an Radio Network Temporary Identity acquisition module 508.

Functions of each module and relationship between the modules will be introduced respectively in detail below.

The first data acquisition module 500 is configured to acquire PDCCH data.

The second data acquisition module 502 is configured to group the PDCCH data according to Identifications of Positions of REs, and acquire soft bit data according to each group of PDCCH data.

The third data acquisition module 504 is configured to acquire CCE soft bit data from the soft bit data:

DCI data acquisition module 506 is configured to determine DCI data according to the CCE soft bit data.

The Radio Network Temporary Identity acquisition module 508 is configured to acquire Random Access Radio Network Temporary Identity according to the DCI data to finish PDCCH blind detection.

In conclusion, the technical solution of the invention is the PDCCH blind detection on the occasion that user's RNTI is unknown and the number of users is also unknown. The invention includes the steps of performing power detection to the PDCCH information received according to the characteristics of Tail Biting convolutional encoding, grouping the continuous REs, subjecting each group of data to channel equalization, detection and demodulation, and descrambling respectively, and extracting data out according to the different aggregation levels, subjecting all possible DCI formats to rate de-matching and decoding, acquiring the correct DCI according to the characteristics of Tail Biting convolutional encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

Embodiment 6

A PDCCH blind detection system according to the embodiment of the invention is described in detail.

Figure 6:
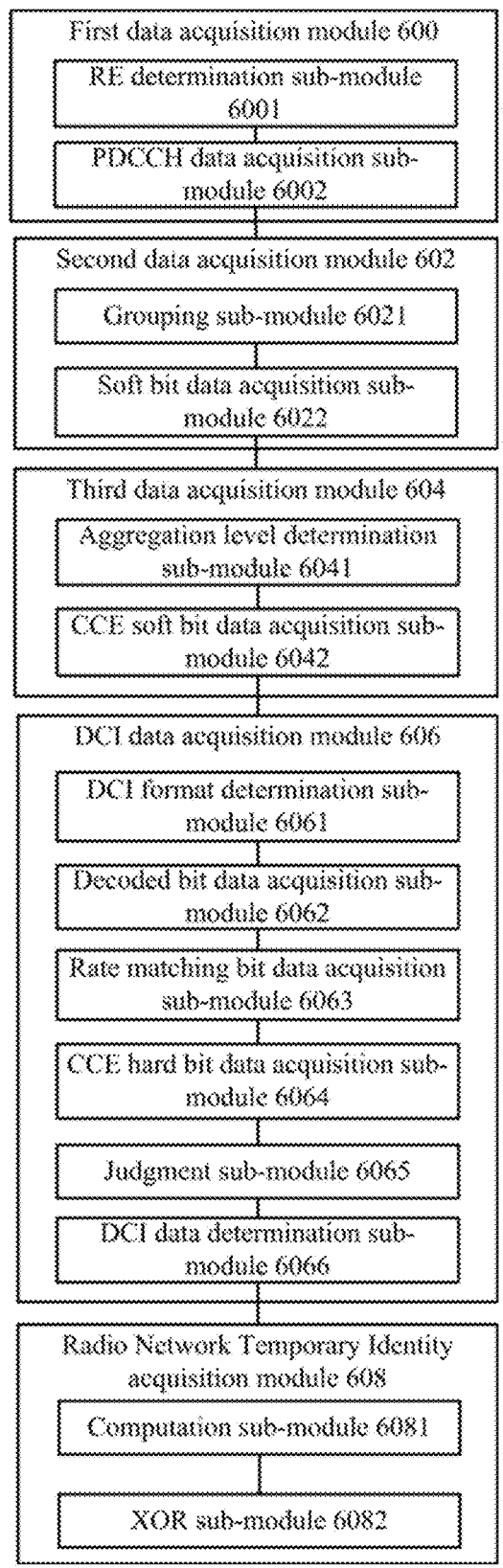
FIG. 6 is a schematic structural diagram of a PDCCH blind detection system in embodiment 6 of the present application.

Referring to FIG. 6, the schematic structural diagram of a PDCCH blind detection system according to the embodiment of the invention is illustrated.

The system can include: a first data acquisition module 600, a second data acquisition module 602, a third data acquisition module 604, a DCI data acquisition module 606, and a Radio Network Temporary Identity acquisition module 608.

The first data acquisition module 600 can include: an RE determination module 6001, and a PDCCH data acquisition module 6002.

The second data acquisition module 602 can include: a grouping module 6021, and a soft bit data acquisition module 6022.

The third data acquisition module 604 can include: an aggregation level determination module 6041, and a CCE soft bit data acquisition module 6042.

The DCI data acquisition module 606 can include: a DCI format determination sub-module 6061, a decoded bit data acquisition sub-module 6062, a rate matching bit data acquisition sub-module 6063, a CCE hard bit data acquisition sub-module 6064, a judgment sub-module 6065, and a DCI data determination sub-module 6066.

The Radio Network Temporary Identity acquisition module 608 can include a computation module 6081, and an XOR module 6082.

Functions of each module and sub-module, and relationship between the modules and between the sub-modules will be introduced respectively in detail below.

The first data acquisition module 600 is configured to acquire PDCCH data.

Preferably, the first data acquisition module 600 can include:

an RE determination module 6001 which is configured to determine the REs occupied by PDCCH in one subframe according to the number of OFDM symbols occupied by the PDCCH acquired from decoded PCFICH and the preset system configuration information:

a PDCCH data acquisition module 6002 which is configured to perform power detection to the REs and acquire the PDCCH data of the REs of which the power is larger than the preset power threshold.

The second data acquisition module 602 is configured to group the PDCCH data according to the Identifications of Positions of REs, and acquire the soft bit data according to each group of PDCCH data.

Preferably, the second data acquisition module 602 can include:

a grouping module 6021 which is configured to group the PDCCH data corresponding to the REs with continuous Identifications of Positions into one group;

a soft bit data acquisition submodule 6022 which is configured to perform channel equalization, demodulation and descrambling to each group of PDCCH data respectively to acquire the soft bit data.

The third data acquisition module 604 is configured to acquire CCE soft bit data from the soft bit data:

Preferably, the third data acquisition module 604 can include:

an aggregation level determination module 6041 configured to determine the aggregation level of the soft bit data according to the aggregation level corresponding to the Common Search Space and UE-Specific Search Space;

a CCE soft bit data acquisition module 6042 configured to acquire the CCE soft bit data according to the aggregation level of the soft bit data start from the data head of the soft bit data.

DCI data acquisition module 606 is configured to determine DCI data according to the CCE soft bit data.

Preferably, DCI data acquisition module 606 can include:

a DCI format determination module 6061 configured to determine the DCI format in the PDCCH;

a decoded bit data acquisition module 6062 configured to perform rate de-matching and convolutional decoding to the CCE soft bit data according to the DCI format to acquire the decoded bit data;

a rate matching bit data acquisition module 6063 configured to perform Tail Biting convolutional encoding and rate matching to the decoded bit data to acquire rate matched bit data;

a CCE hard bit data acquisition module 6064 configured to perform hard decision to the CCE soft bit data to acquire CCE hard bit data;

a judgment sub-module 6065 configured to determine whether the rate matches bit data equal to the CCE hard bit data:

and a DCI data determination sub-module 6066 configured to determine the decoded bit data to be DCI data when the rate matched bit data is equal to the CCE hard bit data: wherein, the DCI data include DCI bit data and the first CRC bit data.

The Radio Network Temporary Identity acquisition module 608 is configured to acquire Random Access Radio Network Temporary Identity according to the DCI data to finish PDCCH blind detection.

Preferably, the RNTI acquisition module 608 can include:

a computation module 6081 configured to compute and acquire the second CRC bit data according to the DCI data:

and an XOR module 6082 configured to perform XOR operation to the second CRC bit data acquired and the first CRC bit data in the DCI data to acquire the Random Access Radio Network Temporary Identity.

In conclusion, the technical solution of the invention is the PDCCH blind detection on the occasion that user's RNTI is unknown and the number of users is also unknown. The invention includes the steps of performing power detection to the PDCCH information received according to the characteristics of Tail Biting convolutional encoding, grouping the continuous REs, subjecting each group of data to channel equalization, detection and demodulation, and descrambling respectively, and extracting data out according to the different aggregation levels, subjecting all possible DCI formats to rate de-matching and decoding, acquiring the correct DCI according to the characteristics of Tail Biting convolutional encoding, and extracting the CRC bits after decoding and the CRC bits acquired according to DCI after decoding for XOR, and finally acquiring the correct RNTI. The technical solution is applicable when the user's RNTI is unknown, and can ensure the accuracy of PDCCH blind detection, and greatly reduce the computation amount and time.

The computer readable recording medium includes any mechanism which is configured to store or transfer information in the computer readable (such as a computer) form. For example, machine-readable medium includes read-only memory (ROM), random access memory (RAM), disk storage medium, optical storage media, flash memory medium, and electrical, optical, and acoustic or other forms of propagation signals (such as carrier signal, infrared signal and digital signal), and the like.

The system embodiments are simply described, because the system embodiments are basically similar to the method embodiments; descriptions of the method embodiments can be consulted for relevant descriptions of system embodiments.

Embodiments in the specifications are described in a progressive way. Emphases on the description of each embodiment are the part different from other embodiments. The same or similar parts of the embodiments can be referred to mutually.

Those skilled in the art can appreciate that all or part of steps according to the above methods can be implemented in hardware associated with the program instruction. The program can be stored in a computer readable storage medium, when the program executed, the steps according to method embodiments above. The mentioned storage medium includes various mediums that can store program codes, such as ROM, RAM, disks, or optical disks and the like.

Lastly it shall be noted that the embodiments above are merely intended to illustrate but not to limit the technical solution of the disclosure; and although the disclosure has been described above in details with reference to the embodiments above, those ordinarily skilled in the art shall appreciate that they can modify the technical solution recited in the respective embodiments above or make equivalent substitutions to a part of the technical features thereof; and these modifications or substitutions to the corresponding technical solution shall also fall into the scope of the disclosure as claimed.

What is claimed is:

1. A Physical Downlink Control Channel (PDCCH) blind detection method, comprising:
   acquiring PDCCH data;
   grouping the PDCCH data according to Identifications of Positions of Resource Elements (REs), and acquiring soft bit data according to each group of PDCCH data after grouping;
   acquiring Control Channel Element (CCE) soft bit data from the soft bit data;
   determining Downlink Control Information (DCI) data according to the CCE soft bit data; and
   acquiring Random Access Radio Network Temporary Identity according to the DCI data to finish PDCCH blind detection.

2. The method of claim 1, wherein the acquiring PDCCH data comprises:
   determining REs occupied by PDCCH in one subframe according to the number of Orthogonal Frequency Division Multiplexing (OFDM) symbols occupied by the PDCCH acquired from decoded Physical Control Format Indicator Channel (PCFICH) and preset system configuration information; and
   performing power detection to the REs and acquiring the PDCCH data corresponding to the REs of which the power is larger than a preset power threshold.

3. The method of claim 1, wherein the grouping the PDCCH data according to the Identifications of Positions of REs and acquiring the soft bit data according to each group of PDCCH data after grouping comprises:
   grouping the PDCCH data corresponding to the REs with continuous Identifications of Positions into one group; and performing channel equalization, demodulation and descrambling to each group of PDCCH data respectively to acquire the soft bit data.

4. The method of claim 1, wherein the acquiring CCE soft bit data from the soft bit data comprises:
determining a aggregation level of the soft bit data according to a aggregation level corresponding to a Common Search Space and a UE-Specific Search Space; and
acquiring the CCE soft bit data according to the aggregation level of the soft bit data start from a data head of the soft bit data.

5. The method of claim 1, wherein the determining DCI data according to the CCE soft bit data comprises:
determining a DCI format in the PDCCH;
subjecting the CCE soft bit data to rate de-matching and convolutional decoding according to the DCI format to acquire the decoded bit data;
performing Tail Biting convolutional encoding and rate matching to the decoded bit data to acquire the rate matched bit data;
performing hard decision to the CCE soft bit data to acquire CCE hard bit data; and
determining whether the rate matched bit data equal to the CCE hard bit data; and
determining the decoded bit data to be the DCI data when the rate matched bit data is equal to the CCE hard bit data;
wherein, the DCI data comprises DCI bit data and a first Cyclic Redundancy Check (CRC) bit data.

6. The method of claim 5, wherein the acquiring Random Access Radio Network Temporary Identity according to the DCI data comprises:
computing and acquiring a second CRC bit data according to the DCI data; and
performing XOR operation to the second CRC bit data acquired and the first CRC bit data in the DCI data to acquire the Random Access Radio Network Temporary Identity.

7. A Physical Downlink Control Channel (PDCCH) blind detection system, comprises:
a first data acquisition module configured to acquire PDCCH data;
a second data acquisition module configured to group the PDCCH data according to Identifications of Positions of Resource Elements (REs), and acquire soft bit data according to each group of PDCCH data after grouping;
a third data acquisition module configured to acquire Control Channel Element (CCE) soft bit data from the soft bit data;
a DCI data acquisition module configured to determine Downlink Control Information (DCI) data according to the CCE soft bit data; and
a Radio Network Temporary Identity acquisition module configured to acquire Random Access Radio Network Temporary Identity according to the DCI data to finish PDCCH blind detection.

8. The system of claim 7, wherein the first data acquisition module comprises:
a resource element determination module configured to determine REs occupied by PDCCH in one subframe according to the number of Orthogonal Frequency Division Multiplexing (OFDM) symbols occupied by the PDCCH acquired from decoded PCFICH and preset system configuration information; and
a PDCCH data acquisition module configured to perform power detection to the REs and acquire the PDCCH data corresponding to the REs of which the power is larger than a preset power threshold.

9. The system of claim 7, wherein the second data acquisition module comprises:
a grouping module configured to group the PDCCH data corresponding to the REs with continuous Identifications of Positions into one group; and
a soft bit data acquisition module configured to perform channel equalization, demodulation and descrambling to each group of PDCCH data respectively to acquire the soft bit data.

10. The system of claim 7, wherein the third data acquisition module comprises:
an aggregation level determination module configured to determine a aggregation level of the soft bit data according to a aggregation level corresponding to a Common Search Space and a UE-Specific Search Space; and
a CCE soft bit data acquisition module configured to acquire the CCE soft bit data according to the aggregation level of the soft bit data start from a data head of the soft bit data.

11. The system of claim 7, wherein the DCI data acquisition module comprises:
a DCI format determination module configured to determine a DCI format in the PDCCH;
a decoded bit data acquisition module configured to subject the CCE soft bit data to rate de-matching and convolutional decoding according to the DCI format to acquire the decoded bit data;
a rate matching bit data acquisition module configured to perform Tail Biting convolutional encoding and rate matching to the decoded bit data to acquire rate matched bit data;
a CCE hard bit data acquisition module configured to perform hard decision to the CCE soft bit data to acquire CCE hard bit data;
a judgment module configured to determine whether the rate matched bit data equal to the CCE hard bit data; and
a DCI data determination module configured to determine the decoded bit data to be DCI data when the rate matched bit data is equal to the CCE hard bit data;
wherein, the DCI data comprises DCI bit data and a first Cyclic Redundancy Check (CRC) bit data.

12. The system of claim 11, wherein the Radio Network Temporary Identity acquisition module comprises:
a computation module configured to compute and acquire a second CRC bit data according to the DCI data; and
an XOR module configured to perform XOR operation to the second CRC bit data acquired and the first CRC bit data in the DCI data to acquire the Random Access Radio Network Temporary Identity.

13. A non-transitory computer readable recording medium for recording a program that, when executed by a processor, causes the processor to perform a Physical Downlink Control Channel (PDCCH) blind detection method, comprising:
acquiring PDCCH data;
grouping the PDCCH data according to Identifications of Positions of Resource Elements (REs), and acquiring soft bit data according to each group of PDCCH data after grouping;
acquiring Control Channel Element (CCE) soft bit data from the soft bit data;

determining Downlink Control Information (DCI) data according to the CCE soft bit data; and acquiring Random Access Radio Network Temporary Identity according to the DCI data to finish PDCCH blind detection.

14. The method of claim 2, wherein the grouping the PDCCH data according to the Identifications of Positions of REs and acquiring the soft bit data according to each group of PDCCH data after grouping comprises:

grouping the PDCCH data corresponding to the REs with continuous Identifications of Positions into one group; and performing channel equalization, demodulation and descrambling to each group of PDCCH data respectively to acquire the soft bit data.

15. The system of claim 8, wherein the second data acquisition module comprises:

a grouping module configured to group the PDCCH data corresponding to the REs with continuous Identifications of Positions into one group; and a soft bit data acquisition module configured to perform channel equalization, demodulation and descrambling to each group of PDCCH data respectively to acquire the soft bit data.

* * * * *